United States Patent [19]

Henry et al.

[11] 3,968,259

[45] July 6, 1976

[54] SILAGE PRESERVATIVE

[75] Inventors: Jack P. Henry; James D. Myers, both of Eagle Grove, Iowa

[73] Assignee: M & M Livestock Products Co., Inc., Eagle Grove, Iowa

[22] Filed: Mar. 6, 1975

[21] Appl. No.: 555,812

[52] U.S. Cl............................................. 426/63; 426/9
[51] Int. Cl.²............................................. A23K 3/03
[58] Field of Search .................. 426/61, 74, 52, 53, 426/54.9, 321, 335, 635, 636, 532, 63

[56] References Cited
UNITED STATES PATENTS

| | | | |
|---|---|---|---|
| 3,033,685 | 5/1962 | Hollenbeck | 426/636 |
| 3,875,304 | 4/1975 | Hunt | 426/54 |

OTHER PUBLICATIONS

Hawley, "Condensed Chemical Dictionary", Van Nostrand Reinhold Co., 8th Edition, p. 159.

*Primary Examiner*—A. Louis Monacell
*Assistant Examiner*—R. B. Penland
*Attorney, Agent, or Firm*—Cushman, Darby & Cushman

[57] ABSTRACT

A product composed of potassium, sodium and magnesium salts, as well as calcium propionate, in combination with an enzyme mixture of protease, amylase, and gumase, with a trace of a mixture of compounds of elements including iron, copper, cobalt, manganese, zinc, iodine and phosphorus, aid in the preservation of digestable protein in silages.

8 Claims, No Drawings

SILAGE PRESERVATIVE

BACKGROUND OF THE INVENTION

Animals require generally the same nutrients as man. For maintenance, growth, reproduction and good health, animals require a diet of carbohydrates, protein, fat, minerals, and vitamins.

Small amounts of protein are necessary for maintenance of the physical well being of animals, in particular, for repair of muscles, internal organs and other body tissues. High grade protein is usually supplied by eggs, milk, fish meal, meat by-products and soybean meal, which usually contain the correct amounts of essential amino acids. Low quality protein, such as that in corn grain (maize), contains too little of one or more essential amino acids. The quality of the protein in food is of little importance to animals, particularly to ruminants, including cattle, sheep, goats and other animals that have four stomachs, because bacteria in the digestive tract of these animals aid in the digestion of food and in using simple nitrogen compounds to build proteins.

Experiments dealing with digestion and balance have measured the degree to which the various components of animal feed are absorbed and retained by the animal body. Protein requirements may be expressed as the amount of digestable protein needed for growth or other body functions. The energy required by animals, as measured as digestable energy (DE), metabolizable energy (ME), net energy (NE), or total digestable nutrients (TDN).

In accordance with the present invention, it has been discovered that it is possible to increase the digestable protein in silages. The discovery is obviously of economic advantage. Practically, the invention provides to the art a composition for extending the usefulness of any given quantity of silage and feed stock for animals.

The invention is directed to a composition, and its use, for preservation of certain nutritional ingredients, mainly digestive protein, in silages.

SUMMARY OF THE INVENTION

A composition comprising non-toxic potassium, sodium and magnesium salts, plus calcium propionate, in combination with an enzyme mixture of protease, amylase, and gumase, in the presence of trace amounts of non-toxic salts, of iron, copper, cobalt, manganese, iodine and zinc, will aid in the preservation of digestable protein in silages. In particular, when such a composition is added to the silage feeds, in amounts of as little as one-half pound per ton of silage feed, will result in increased digestable protein in silages, such as pasture grasses, hay and silage crops.

DETAILED DESCRIPTION OF THE INVENTION

As set forth above, the composition of the invention is directed to a combination of certain essential metal salts in combination with an enzyme mixture of protease, amylase, and gumase. One source of the enzymes is the Bacillus Subtilis. *Aspergillus oryzal* can also be employed as a source.

The essential salts which must be present include salts of calcium, potassium, sodium and magnesium. Calcium should be present in amounts not less than 2 percent by weight, and potassium in amounts of not less than 25 percent, magnesium in amounts of not less than 4 percent, and salts (sodium chloride) in amounts of not less than 8 percent. In addition, the composition of the invention contains trace amounts of iron, copper, cobalt, manganese, and zinc, as well as phosphorus and iodine. The metals are present in the composition in the form of salts or oxides. The elemental component (of salts) should include at least 0.2 percent zinc, at least 0.2 percent manganese, 0.05 percent copper, 0.1 percent iron, 0.2 percent iodine, and at least 0.5 percent phosphorus. The metal components of the composition may be present as salts of the metals, including chloride, sulfate, carbonate, phosphates, and propionates wherein at least one of the salts is calcium propionate. In addition, the metals may be present as oxides.

In a commercially preferred embodiment, in addition to the fermentation products of Bacillus Subtilis (source of enzymes), metals of the salts set forth above are present in the composition of the invention in the following amounts: calcium, not less than 2 percent and not more than 3 percent; salt (sodium chloride), not less than 10 percent and not more than 11 percent; potassium, not less than 30 percent; magnesium, not less than 5 percent; iron, not less than 0.2 percent; copper, not less than 0.1 percent; manganese, not less than 0.3 percent, and zinc, not less than 0.03 percent, while phosphorus is also present in amounts of not less than 0.7 percent and iodine, which is present in amounts not less than 0.03 percent. Practically, the invention of the composition may contain the aforementioned elemental components in the following ranges: 1.5 percent to 5 percent calcium; 0.5 to 2 percent phosphorus, 8 to 15 percent salt (sodium chloride); 0.02 to 0.05 percent iodine, 25 to 35 percent potassium, 3 to 8 percent magnesium, 0.1 to 0.5 percent iron, 0.05 to 0.25 percent copper, 0.1 to 0.5 percent manganese, 0.01 to 0.05 percent zinc and 0.001 to 0.0025 cobalt. In these compositions, the enzyme source, e.g., Bacillus Subtilis fermentation product is present in amounts ranging from 1 percent to 5 percent. The phosphorus in these compositions may be present as phosphates, polyphosphates and tripolyphosphates. The iodine may be present in the sodium chloride component of the composition of the invention or may be present as the anion of one of the metal salts or as an acid, e.g., HI.

The salts of the composition serve two purposes. The salts maintain the electrolyte level of the feed stocks, and are also necessary to the animal diet for maintaining pH balance and electrolyte content of the digestive tract, and more importantly aids and assists in the formation of new tissue and sustains growth of the animal. Further, inclusion of these salts maintains the electrolyte balance of the blood and reduces weight loss of animals under strain.

When these metal components are used in the salt or oxide form, as in accordance with the invention, the salts or oxides of the metals can be present in the following ranges:

| Oxide or Salt of | % By Weight |
|---|---|
| K | 59 — 64 |
| Na | 8 — 12 |
| Mg | 10 — 15 |
| Ca | 8 — 12 |
| Fe | 0.1 — 0.6 |
| Cu | 0.1 — 0.3 |
| Mn | 0.2 — 0.6 |
| Zn | 0.2 — 0.6 |
| P | 1.0 — 2.2075 |
| I | 0.2 — 0.6 |

| -continued | |
|---|---|
| Oxide or Salt of | % By Weight |
| Co | 0.0001 – 0.0025 | in the presence of 1 to 5 weight percent of Bacillus Subtilus fermentation products.

In addition, the presence of these salts act as enzyme activators and enhance enzyme activity.

Unless otherwise expressly specified, all percents are percent by weight.

EXAMPLE

A composition in accordance with the invention was prepared comprising the following components:

| Component | Percent by Weight |
|---|---|
| Potassium Chloride | 50.00% |
| Sodium Chloride | 10.00% |
| Potassium Sulfate | 11.25% |
| Magnesium Sulfate | 13.75% |
| Calcium Propionate | 10.00% |
| Fermentation Products of Bacillus Subtilis (source of enzymes) | 1.50% |
| Sodium Tripolyphosphate | 1.20% |
| Iron Carbonate | 0.200% |
| Iron Sulfate | 0.203% |
| Iron Oxide | 0.100% |
| Copper Oxide | 0.200% |
| Ethylene Diamine Dihydroiodide | 0.025% |
| Cobalt Carbonate | 0.002% |
| Manganese Sulfate | 0.32% |
| Zinc Oxide | 0.25% |
| Mineral Oil | 1.00% |
| | 100.000% |

The fermentation products of Bacillus Subtilis (source of enzymes) contained protease, amylase and gumase in a ratio of 3750, 6240 and 10, respectively. The composition was formed by mixing the respective components.

The aforementioned composition is used by simply adding the composition of the invention to silage feeds and mixing the composition with the silage feed. Thus, another aspect of the invention is the use of the composition of the invention in combination with silage feeds, and in the method of using the composition.

Use of the composition set forth in the example is exemplified by the results set forth in the following tables. Generally, the dosages of the composition of the invention require about ¼- to ¾-pound per ton of grain (corn, milo) silages, preferably ½ pound of the composition of the invention per ton of grain; for oatlage, the range of the composition is between ½ to 1-½ pounds of the composition per ton of oatlage; approximately ½ pound to 1-½ pounds of composition of the invention is then mixed with a ton of haylage. The composition of the invention may be added directly to silage or haylage, or it may be diluted to assist distribution of the composition throughout the silage feed. When diluted, limestone, urea, salt, grains and millfeeds, may be used as the diluent. Generally, 5 to 20 pounds of the composition of the invention in combination with the diluent is added to a ton of silage.

The following tables represent the results obtained by adding the composition of the example to silages. It is to be noted that use of the preservative of the invention increases the amount of digestable protein in a silage, as compared to the same silage which is untreated but maintained under substantially identical conditions. The results set forth in Tables 1 – 3 indicate the results of using the composition of the example above.

TABLE 1

CORN SILAGE TREATED WITH COMPOSITION OF INVENTION

| Farm No. | Dosage | Dry Matter | Protein | Dig. Protein | Comments |
|---|---|---|---|---|---|
| 1 | Untreated | 53.4% | 4.05% | 1.94% (47.9%) | |
| | ½ lb./T.* | 50.0% | 3.97% | 2.15% (54.16%) | More Dig. Protein |
| 2 | Untreated | 49.0% | 2.98% | 0.75% (25.17%) | More Dry Matter |
| | ½ lb./T.* | 62.8% | 4.59% | 2.11% (45.97%) | More Dig. Protein |
| 3 | Untreated | 41.4% | 2.57% | 1.29% (50.19%) | |
| | ½ lb./T.* | 35.9% | 2.94% | 1.70% (57.82%) | More Dig. Protein |
| 4 | Untreated | 35.5% | 3.05% | 1.61% (52.79%) | More Dry Matter |
| | ½ lb./T.* | 40.3% | 3.23% | 2.20% (68.11%) | More Dig. Protein |
| 5 | Untreated | 45.5% | 3.41% | 1.28% (37.5%) | |
| | ½ lb./T.* | 41.1% | 3.72% | 2.09% (56.2%) | More Dig. Protein |
| 6 | Untreated | 30.8% | 2.44% | 0.84% (34.4%) | More Dry Matter |
| | ½ lb./T.* | 33.2% | 2.94% | 1.32% (44.8%) | More Dig. Protein |
| 7 | Untreated | 41.5% | 3.53% | 1.57% (44.5%) | |
| | ½ lb./T.* | 40.2% | 4.33% | 2.41% (55.7%) | More Dig. Protein |
| 8 | Untreated | 41.4% | 3.01% | 1.05% (34.8%) | More Dry Matter |
| | ½ lb./T.* | 45.6% | 2.91% | 1.13% (38.8%) | More Dig. Protein |
| 9 | Untreated | 49.4% | 4.11% | 1.87% (45.5%) | More Dry Matter |
| | ½ lb./T.* | 50.6% | 3.84% | 1.88% (49.0%) | More Dig. Protein |

TABLE 2

HAYLAGE TREATED WITH 1 LB OF THE COMPOSITION OF THE INVENTION

| A | Green Chop | 50.3% | 10.12% | 5.61% (55.4%) | Field Sample |
|---|---|---|---|---|---|
| | Untreated | 51.4% | 10.41% | 3.04% (29.2%) | |
| | 1 lb./T.** | 83.8% | 15.65% | 7.29% (46.14%) | More Dig. Protein |

*By ½ lb./T. is meant ½ lb. of the preservative of the invention per ton of corn silage.
**By 1 lb./T. is meant 1 lb. of preservative per ton of silage.

TABLE 3

| Dosage | GRASS SILAGE 1 lb. SI-LO-FAME/TON | | | Comments |
|---|---|---|---|---|
| | Dry Matter | Protein | Dig. Protein | |
| Experimental Control | 33.8% | 4.81% | 1.26% (26.2%) | More Dry Matter |
| 1 lb./Ton | 39.0% | 6.16% | 3.64% (59.1%) | More Dig. Protein |

The amount of enzymes in the composition of the invention ranges from 3.50 to 4.00 parts per million in a ton of corn silage, when ½ pound of the composition of the invention is added to silage and up to 7 to 8 parts per million in a ton of silage, when one pound of the composition of the invention is added to a ton of silage.

Protein determinations in the above Tables were undertaken by weighing samples of the silage (0.7 to 2.2 grams) in digestion flasks. Approximately 0.7 grams of HgO or 0.65 grams of metallic Hg, 15 grams of powdered $K_2SO_4$ or anhydrous $Na_2SO_4$, and 25 milliliters of concentrated sulfuric acid were added to the sample of silage. If the sample weighed more than 2.2 grams, the sulfuric acid was increased by 10 milliliters for each gram of sample. The flask was placed in an inclined position and heated gently until frothing ceased; when necessary, small amounts of paraffin were added to the sample to reduce frothing. The sample was boiled briskly until the solution of the sample cleared and then for at least three minutes longer and up to two hours longer for samples containing organic material. The sample was then cooled, diluted with approximately 200 ml. of water, cooled again to a temperature below 25°C and then treated with approximately 25 ml. of sulfide or thiosulfate solution to precipitate Hg. Zinc granules were added to the solution to prevent bumping. The flask was tilted and to the flask was added a layer of sodium hydroxide (25 grams of solid reagent or enough sodium hydroxide solution to make the contents of the flask strongly alkaline). The flask was not agitated. Optionally, the thiosulfate or sulfide solution may be mixed with sodium hydroxide solution before addition to the flask. The flask was connected to the distilling bulb on a condenser, and with the tip of the condenser immersed in standardized acid solution contained in the receiver, the flask was rotated to mix the contents thoroughly. The flask was then heated until all $NH_3$ had distilled, which usually resulted in at least 150 ml. of distillate collected. A standard sodium hydroxide solution was used to titrate the excess acid in the distillate, using methyl red as an indicator. Blank determinations were conducted on reagents for correction factors.

Indigestable protein was determined by digesting 1.5 grams of the sample in 100 ml. of a 0.2 solution of pepsin in one normal hydrochloric acid for 24 hours at 35°C. The solution was filtered, the residue was washed with hot water and the indigestable protein was determined by the method set forth above.

The composition of the invention presents an inexpensive alternative to the art for preserving digestable protein in silages.

The products currently available for treatment of silages include mold inhibitor compositions and enzyme compositions.

Corn silage was treated with commercially available silage conditioning compositions. The commercially available additives were added to corn silage contained in 1½ pint glass freezer jars at dosages recommended by the manufacturer. The contents of the jars were allowed to ferment for nearly 60 days before being opened for analysis.

TABLE 4

TESTS OF COMMERCIALLY AVAILABLE SILAGE ADDITIVES ON CORN SILAGE

RESULTS:

| Competitive Product Company No. | Type | Dose | Dry Matter | Protein | Prot. on Dry Basis | Comment |
|---|---|---|---|---|---|---|
| | control | none | 41.0% | 3.76% | 9.17% | |
| 1. | Mold Inhibitor | ½ lb./T.* | 54.6% | 5.29% | 9.69% | More Prot. |
| 2. | Mold Inhibitor | ½ lb./T.* | 48.1% | 4.23% | 8.79% | |
| 3. | Mold Inhibitor | ½ lb./T.* | 46.4% | 4.15% | 8.94% | |
| 4. | Mold Inhibitor | ½ lb./T.* | 57.8% | 5.35% | 9.26% | More Prot. |
| 5. | Mold Inhibitor | ½ lb./T.* | 55.4% | 5.06% | 9.13% | |
| 6. | Mold Inhibitor | ½ lb./T.* | 49.4% | 4.55% | 9.21% | More Prot. |
| 7. | Enzymes | ½ lb./T.* | 58.8% | 5.29% | 9.15% | |
| 8. | Enzymes | ½ lb./T.* | 52.6% | 5.04% | 9.58% | More Prot. |
| 12. | Enzymes | 1 lb./T.* | 48.0% | 4.57% | 9.52% | More Prot. |
| 13. | Enzymes | ¾ lb./T.* | 51.4% | 5.13% | 9.98% | More Prot. |
| 14. | Enzymes | 1 lb./T.* | 42.6% | 3.72% | 8.73% | |

*By lb./T is meant lb. per ton.

The composition of the invention presents an inexpensive alternative to known silage additive compositions. Moreover, the effect of the composition of the invention on the amount of protein contained in dry matter is consistently to preserve the amount of protein in dry matter. By comparison, the effect of the commercially available silage additive compositions varies with respect to the degree of preservation of protein in dry silage matter.

Thus, the invention is directed to a silage preservative composition comprising 1 to 5 percent by weight Bacillus Subtilis fermentation product as a source of the enzymes protease, amylase and gumase, in combination with a mixture (a) comprising salts of potassium, sodium and magnesium and calcium propionate, and mixture (b) containing phosphorus, Fe, Cu, Co, I, Mn, Zn and wherein said phosphorus is present as a phosphate, meaning normal phosphates, polyphosphates, as well as tripolyphosphates, said iodine as present is iodide, wherein said Fe, Cu, Co, Mn and Zn is present in the salt form or as an oxide; wherein the mixture (a) comprises 90 to 98 percent by weight of the preservative and said mixture (b) comprises 1.0 to 5 percent by weight of the preservative, wherein the preservative is capable of effecting an 8 percent increase in the amount of digestable protein contained in silages during storage. These compositions may consist essentially of the aforementioned components in combination with mineral oil in small amounts, ranging from 0.5 to 1.5 percent as lubricants. It is believed, although the invention is not based on this belief, that the loss of digestable protein which occurs in silages during storage is due to excessive heating, resulting from fermentation of silage during its normal storage period. Thus, there has been provided a preservative for silages which is inexpensive and effective in preserving digestable protein in silages.

What is claimed is:

1. A silage preservative comprising an enzyme mixture of protease, amylase, and gumase in combination with mixture (a) which contains calcium propionic and salts of potassium, sodium and magnesium, and mixture (b) containing phosphorus, Fe, Cu, Co, I, Mn, and Zn wherein said phosphorus is present as a phosphate, said iodine is present as iodide ion, wherein each of said Fe, Cu, Co, Mn and Zn is present as a salt or an oxide of the metal, wherein said mixture (a) comprises 90 to 98 percent by weight of the preservative and said mixture (b) comprises 1.0 to 5.0 percent by weight of the preservative; wherein said preservative is capable of effecting an 8 percent increase in the amount of digestable protein contained in silages after storage.

2. The silage preservative of claim 1, wherein said enzyme mixture is the fermentation product of Bacillus Subtilis.

3. The silage preservative of claim 1 which includes 0.5 to 1.5 percent by weight mineral oil.

4. The silage preservative of claim 1, wherein said components are present in the following amounts:

| Oxide or Salt of | % by Weight |
|---|---|
| K | 59 – 64 |
| Na | 8 – 12 |
| Mg | 10 – 15 |
| Ca | 8 – 12 |
| Fe | 0.1 – 0.6 |
| Cu | 0.1 – 0.3 |
| Mn | 0.2 – 0.6 |
| Zn | 0.2 – 0.6 |
| P | 1.0 – 2.2075 |
| iodide ion | 0.2 – 0.6 |
| Co | 0.001 – 0.0025 |

5. The preservative of claim 1, which consists essentially of:

| Component | Percent by Weight |
|---|---|
| Potassium Chloride | 50.00% |
| Sodium Chloride | 10.00% |
| Potassium Sulfate | 11.25% |
| Magnesium Sulfate | 13.75% |
| Calcium Propionate | 10.00% |
| Fermentation Products of Bacillus Subtilis (Source of enzymes) | 1.50% |
| Sodium Tripolyphosphate | 1.20% |
| Iron Carbonate | 0.200% |
| Iron Sulfate | 0.203% |
| Iron Oxide | 0.100% |
| Copper Oxide | 0.200% |
| Ethylene Diamine Dihydroiodide | 0.025% |
| Cobalt Carbonate | 0.002% |
| Manganese Sulfate | 0.32% |
| Zinc Oxide | 0.25% |
| Mineral Oil | 1.00% |
| | 100.000% |

6. A method of preserving digestable protein in silages comprising mixing a preservative with silages, said silages being grain silages, haylages, oatlages or mixtures thereof;

wherein said preservative comprises an enzyme mixture of protease, amylase, and gumase in combination with mixture (a) which contains calcium propionate and salts of potassium, sodium and magnesium, and mixture (b) containing phosphorus, Fe, Cu, Co, I, Mn, and Zn wherein said phosphorus is present as a phosphate, said iodine is present as iodide ion, wherein each of said Fe, Cu, Co, Mn and Zn is present as a salt or an oxide of the metal, wherein said mixture (a) comprises 90 to 98 percent by weight of the preservative and said mixture (b) comprises 1.0 to 5.0 percent by weight of the preservative; wherein said preservative is capable of effecting an 8 percent increase in the amount of digestable protein contained in silages after storage.

7. The method of claim 6, wherein 0.25 to 1.5 pounds of preservative is used per ton of silage.

8. A silage containing the preservative of claim 1 in amounts of 0.25 to 1.5 pounds of preservative per ton of silage.

* * * * *